April 3, 1951  H. G. TELLFORS  2,547,508

TICKET PASTING MACHINE

Filed March 8, 1947  16 Sheets-Sheet 1

INVENTOR.
Herbert G. Tellfors
BY
B. Gordon Allen
Atty.

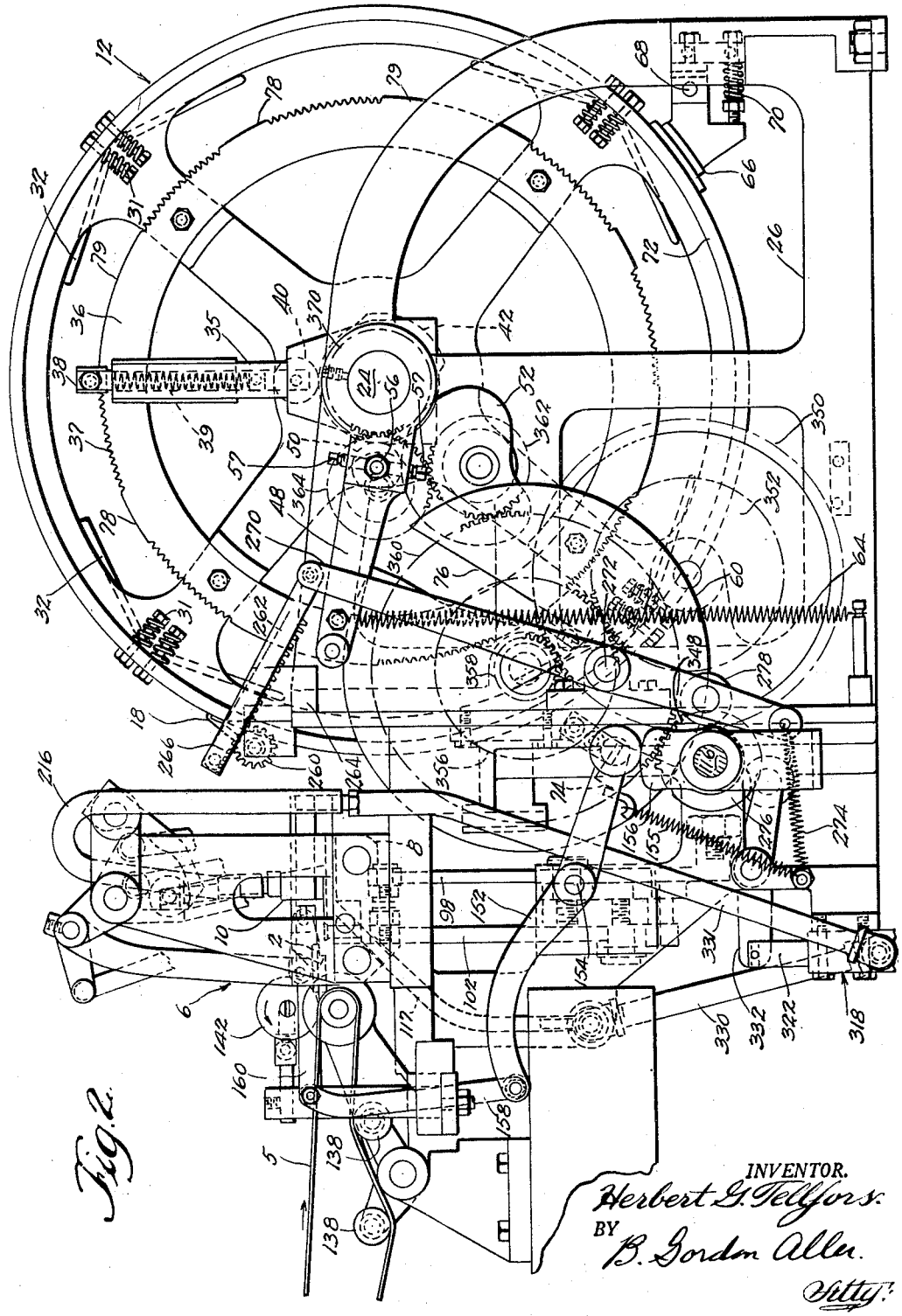

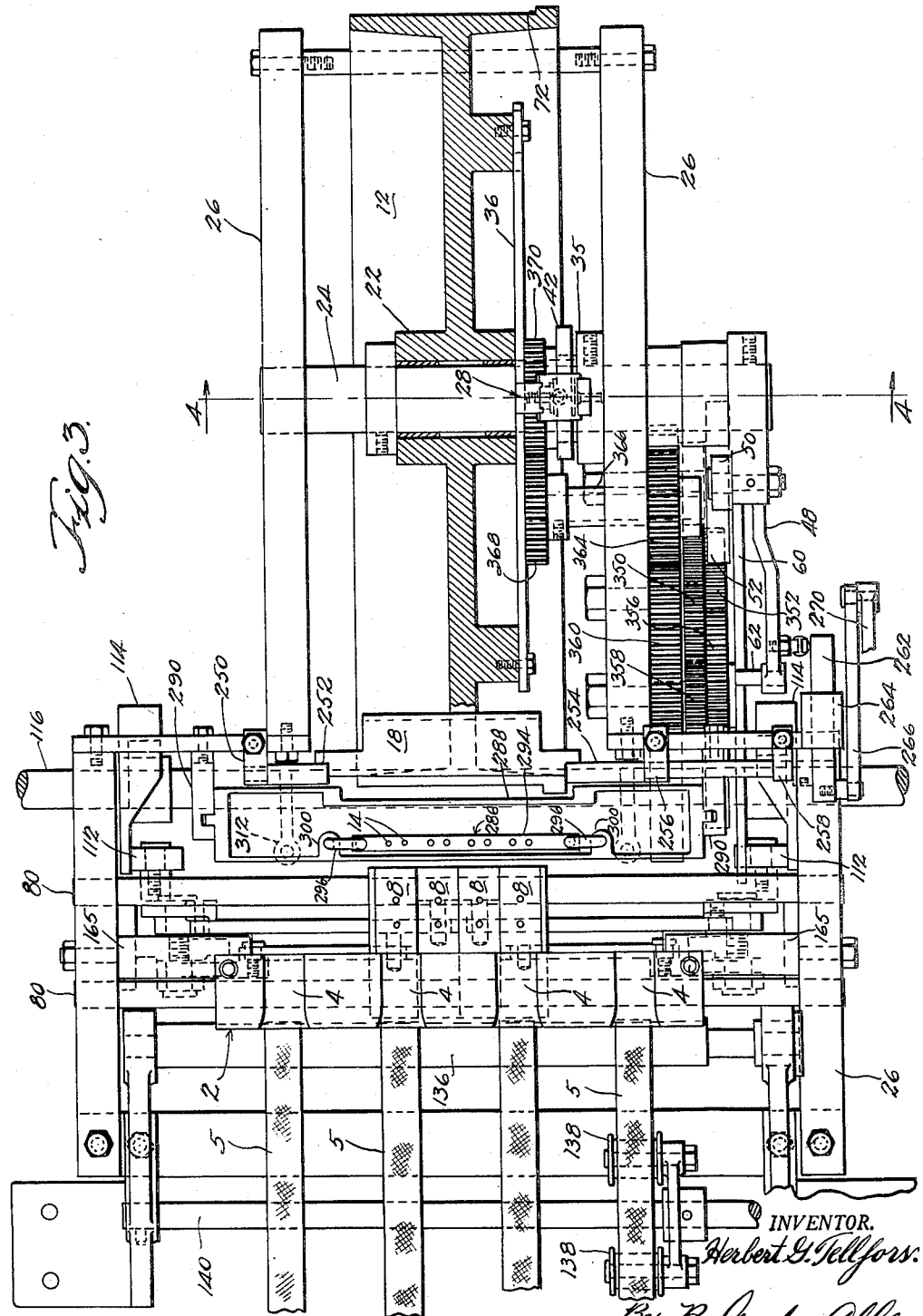

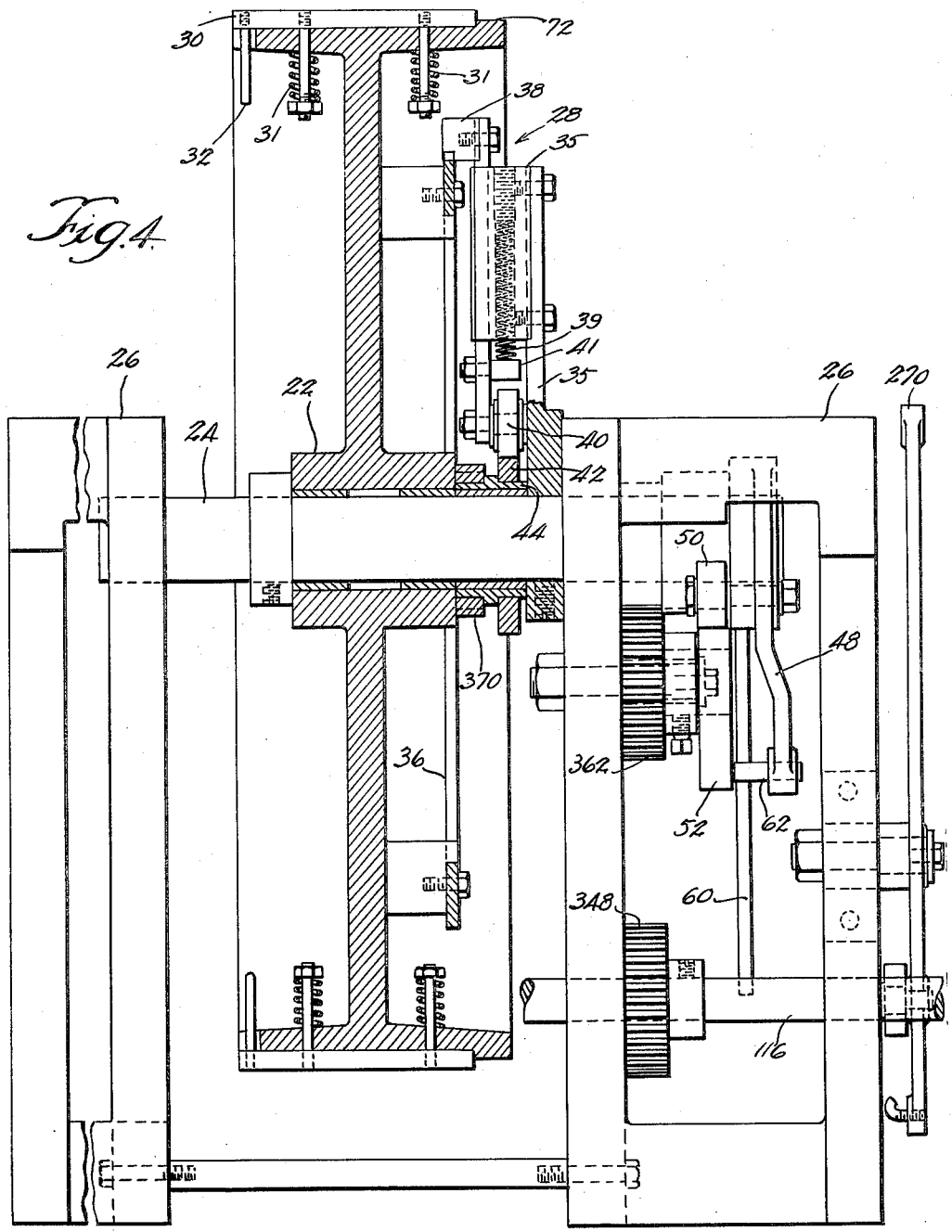

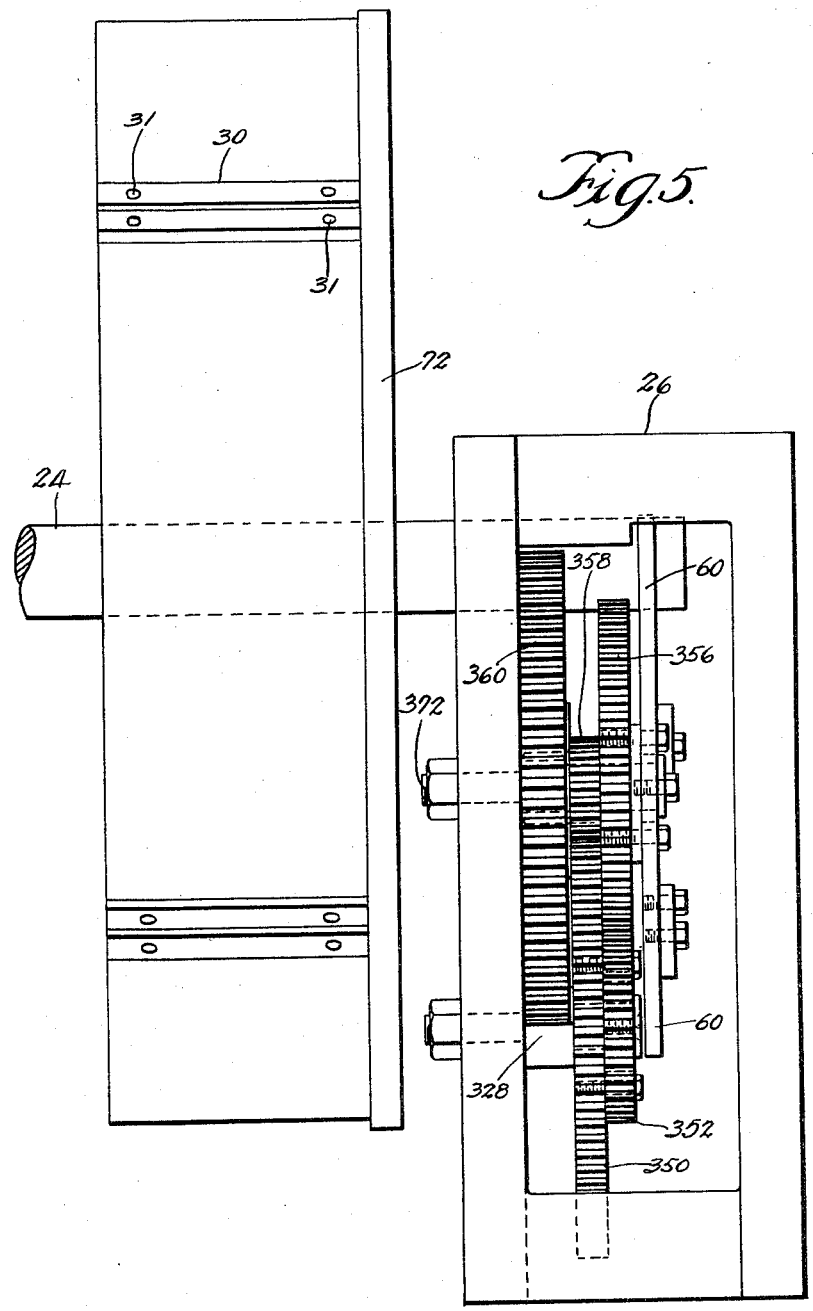

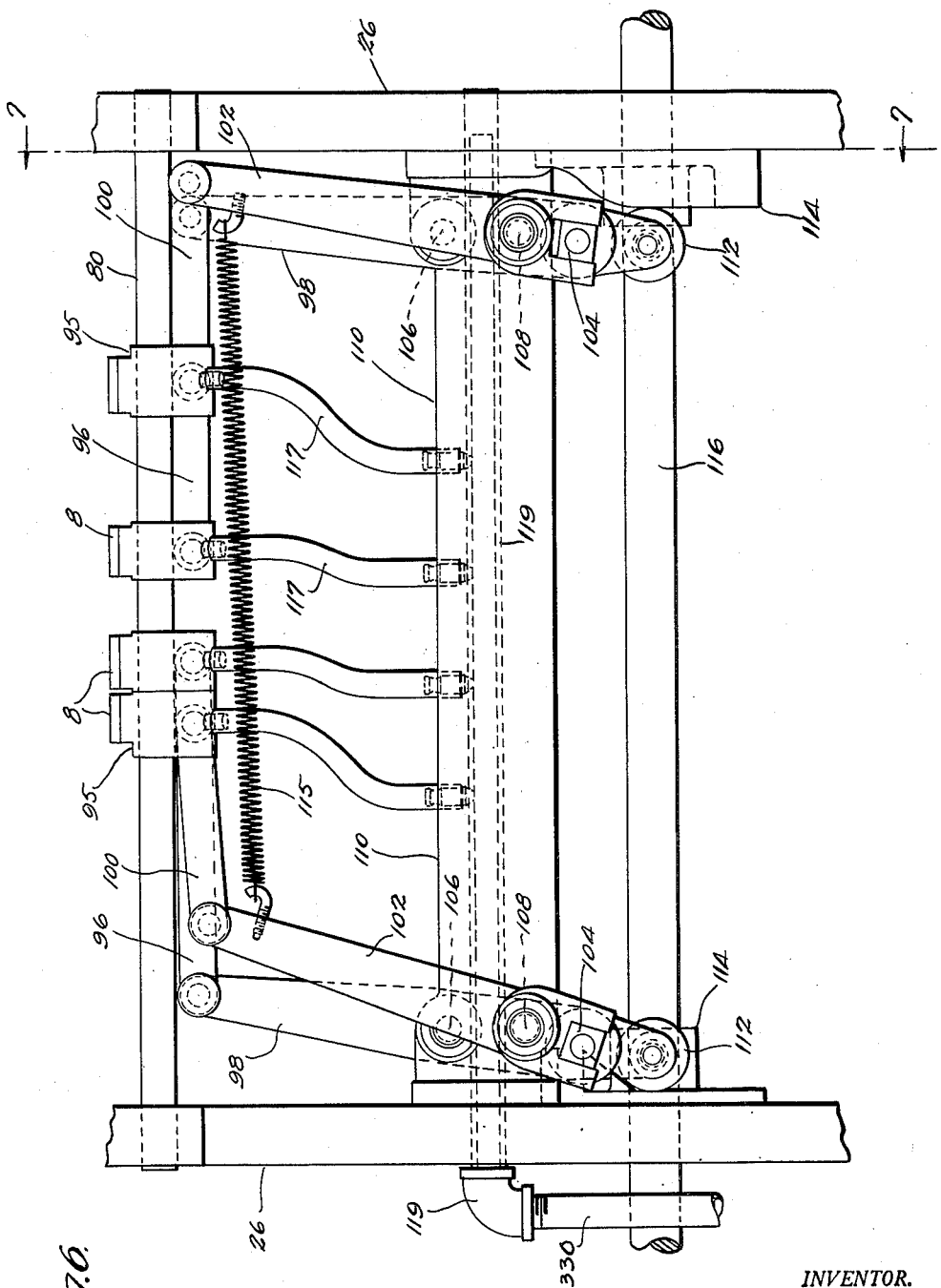

April 3, 1951 H. G. TELLFORS 2,547,508
TICKET PASTING MACHINE
Filed March 8, 1947 16 Sheets-Sheet 7
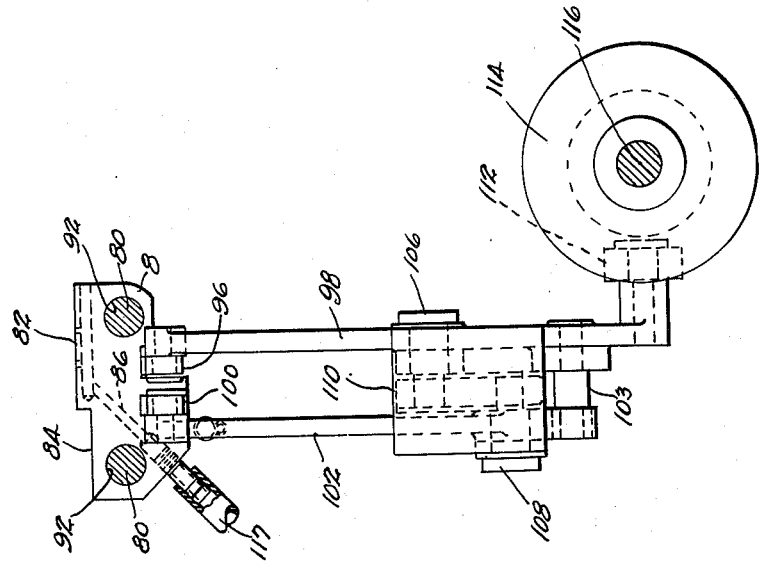
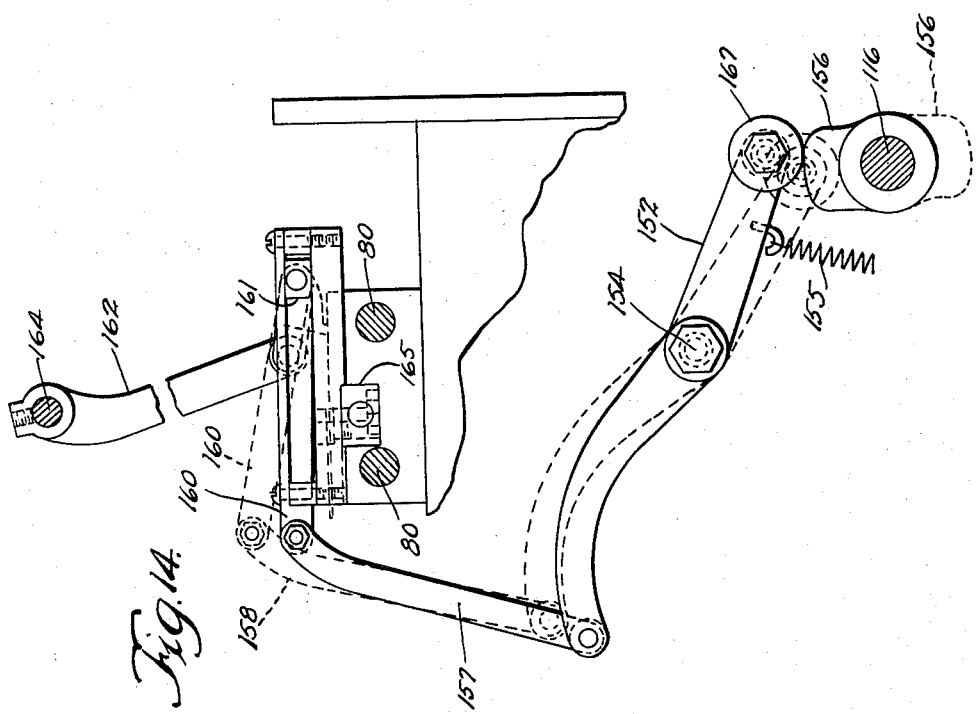
INVENTOR.
Herbert G. Tellfors.
BY B. Gordon Allen.
Atty.

April 3, 1951          H. G. TELLFORS          2,547,508
TICKET PASTING MACHINE
Filed March 8, 1947          16 Sheets-Sheet 8
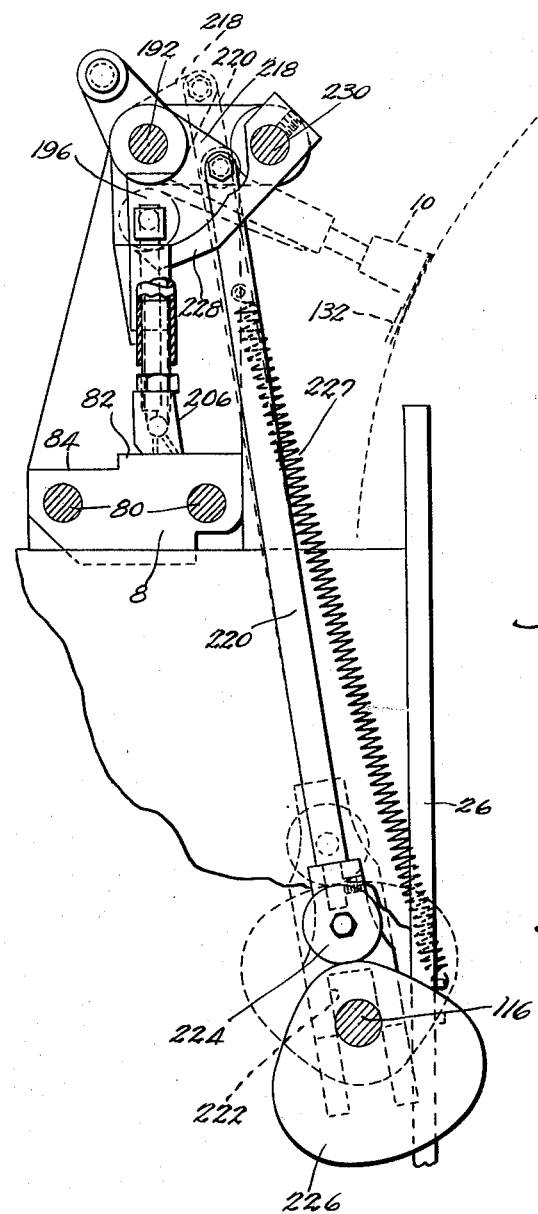
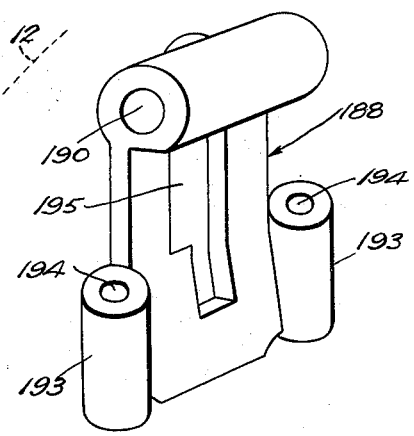
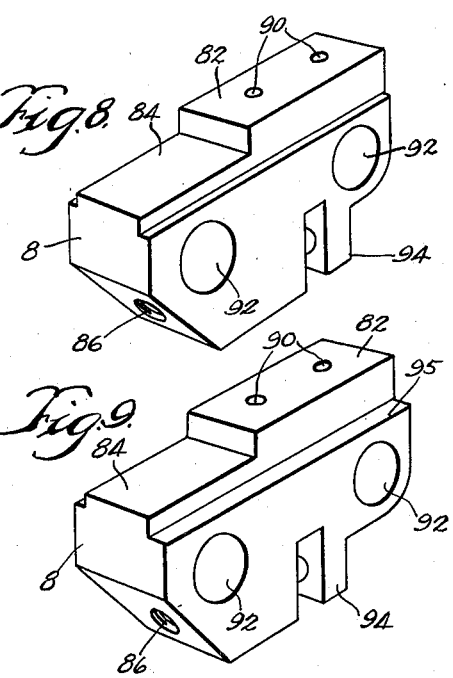
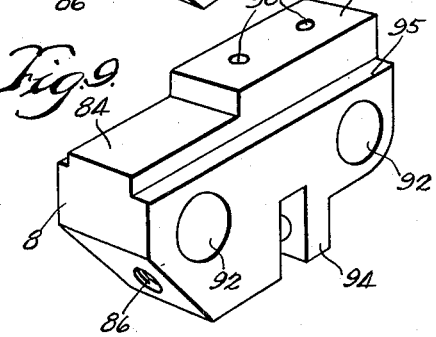
INVENTOR.
Herbert G. Tellfors.
BY B. Gordon Allen.

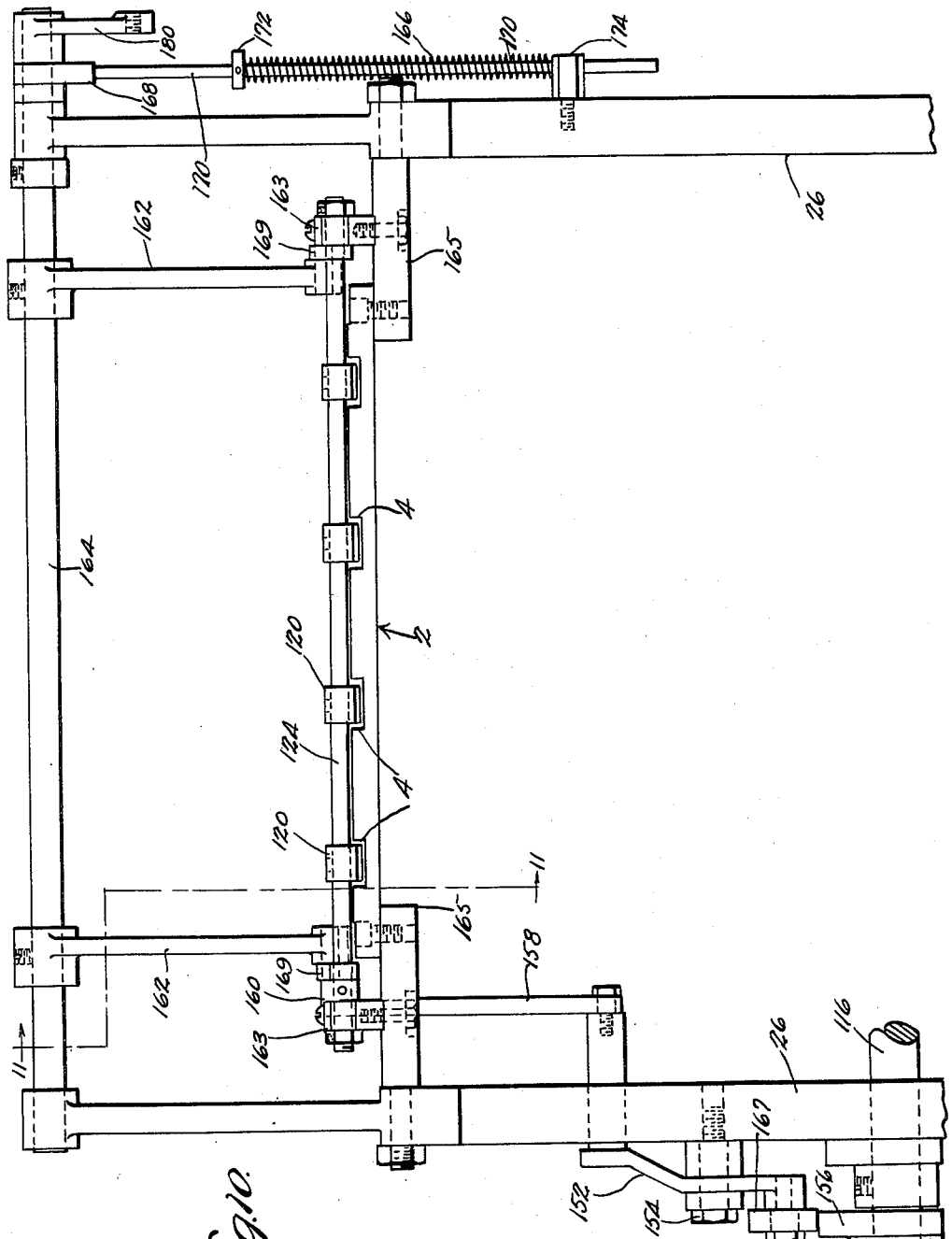

INVENTOR.
Herbert G. Tellfors.
BY
B. Gordan Allen.

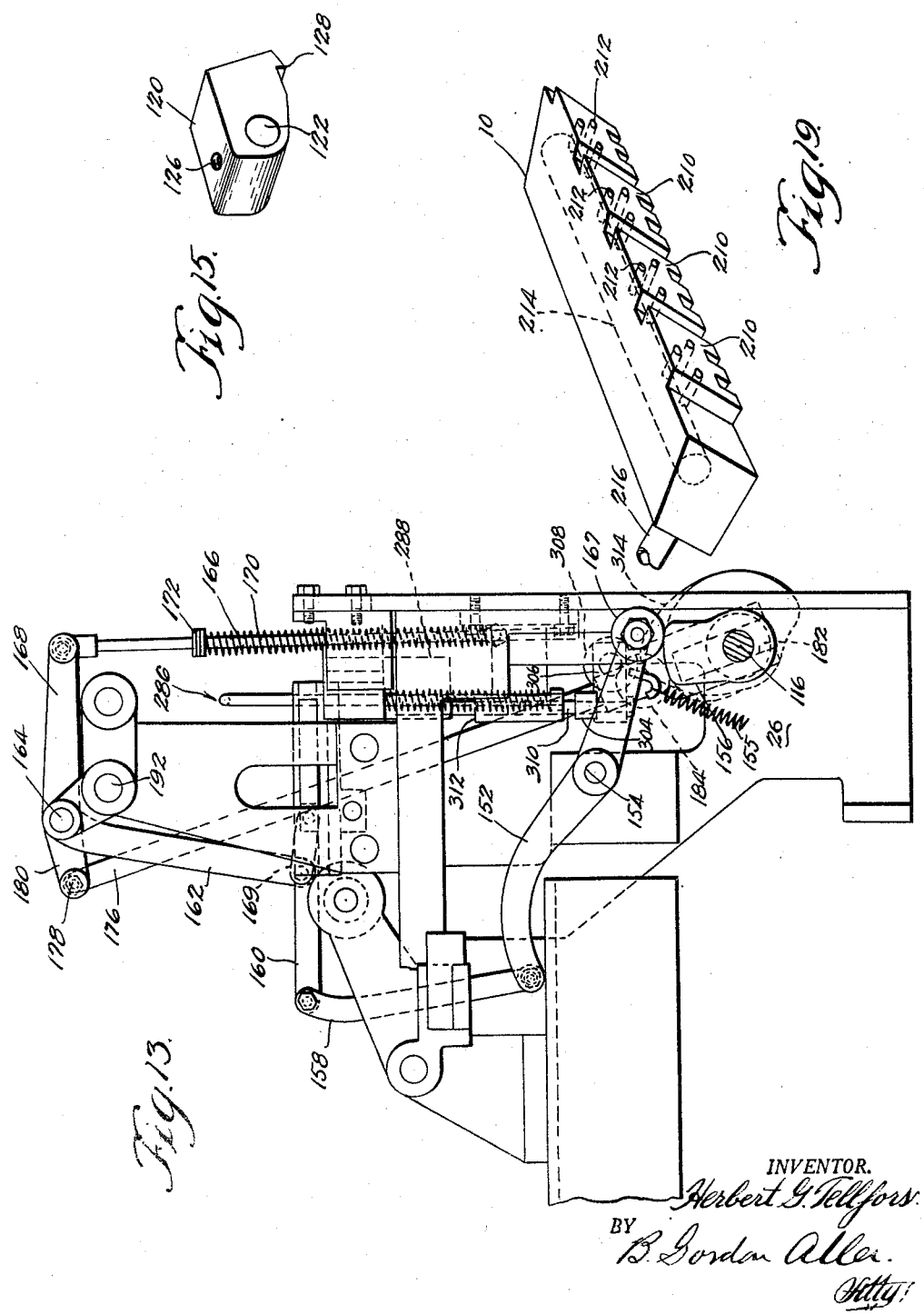

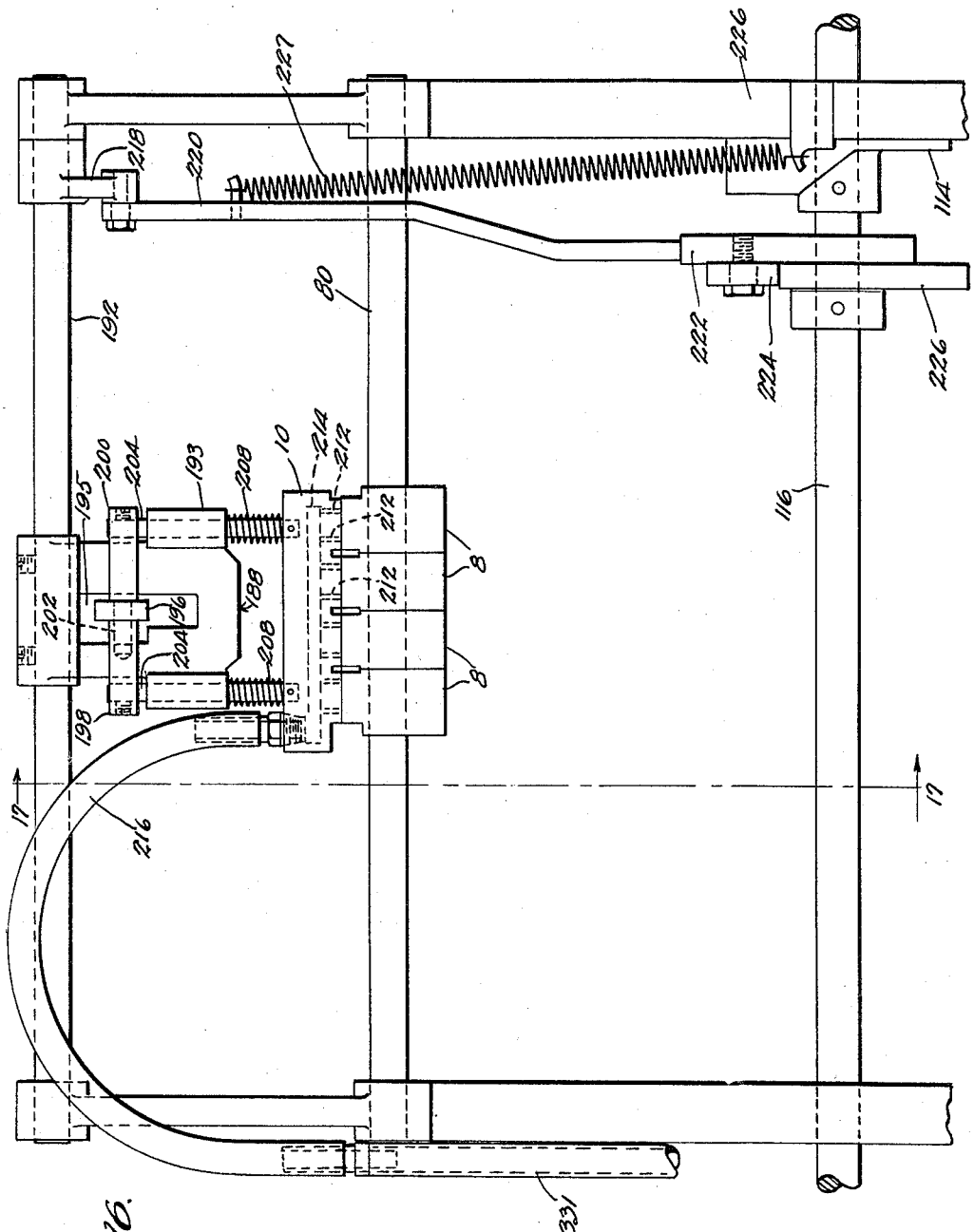

April 3, 1951  H. G. TELLFORS  2,547,508
TICKET PASTING MACHINE
Filed March 8, 1947  16 Sheets-Sheet 13

INVENTOR.
Herbert G. Tellfors.
BY
B. Gordon Allen.
Atty.

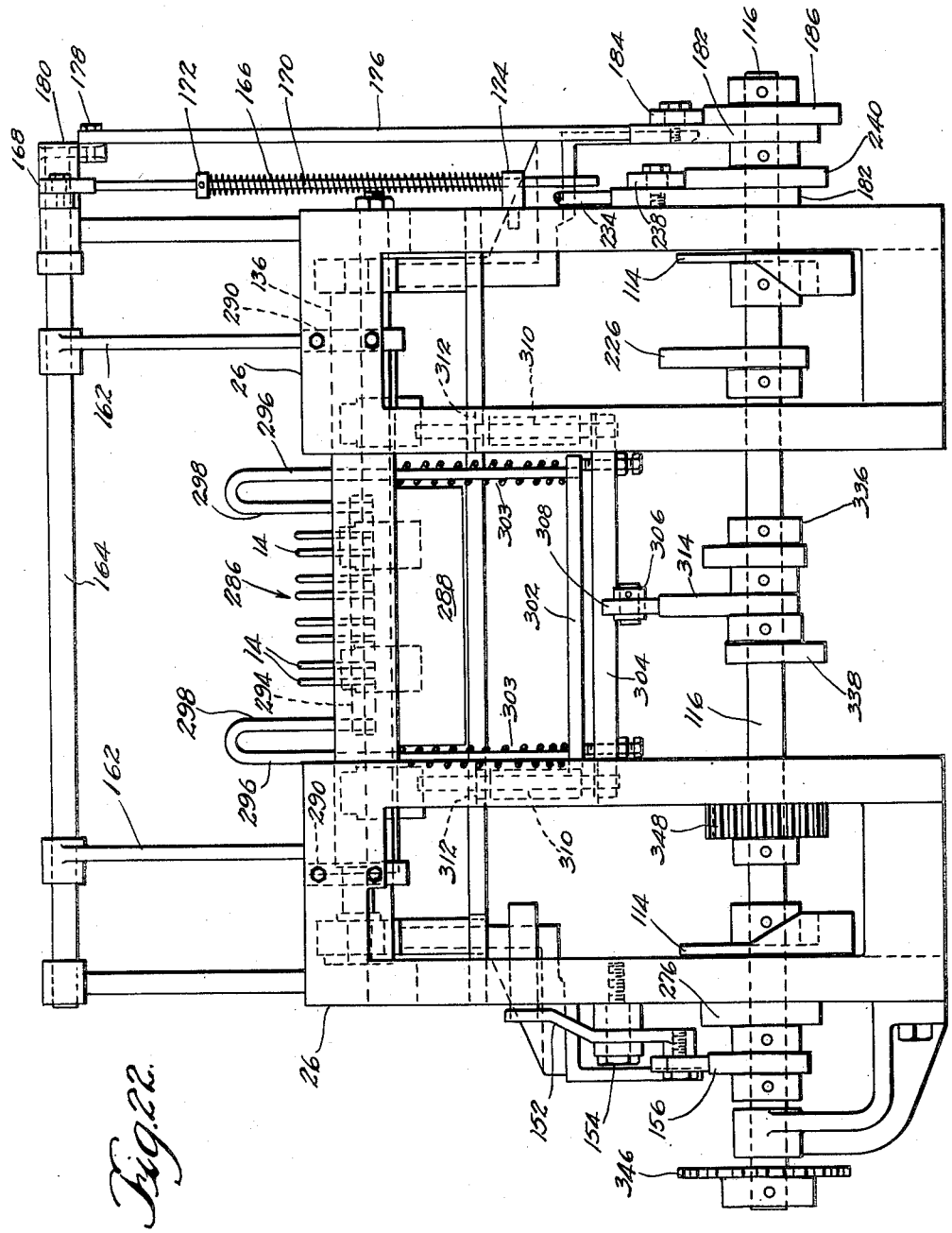

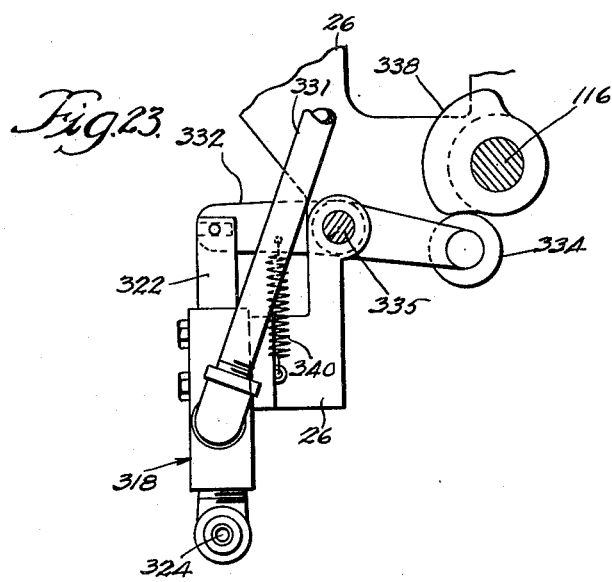
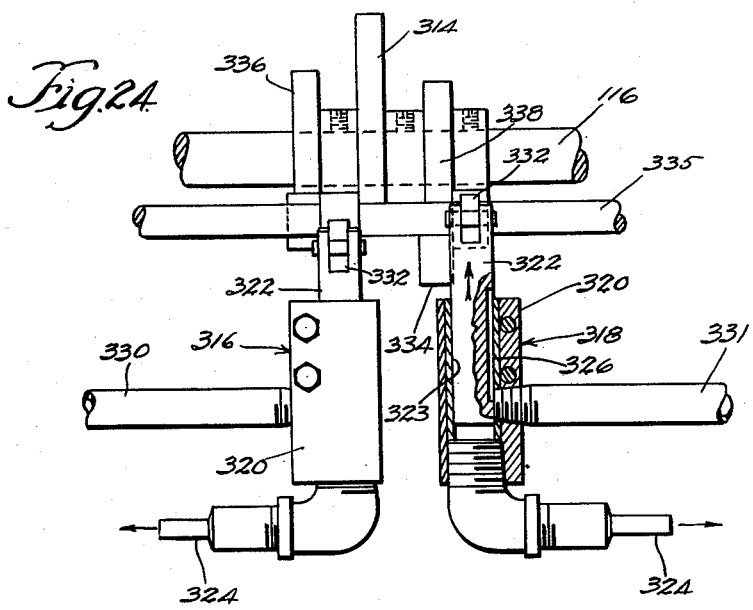

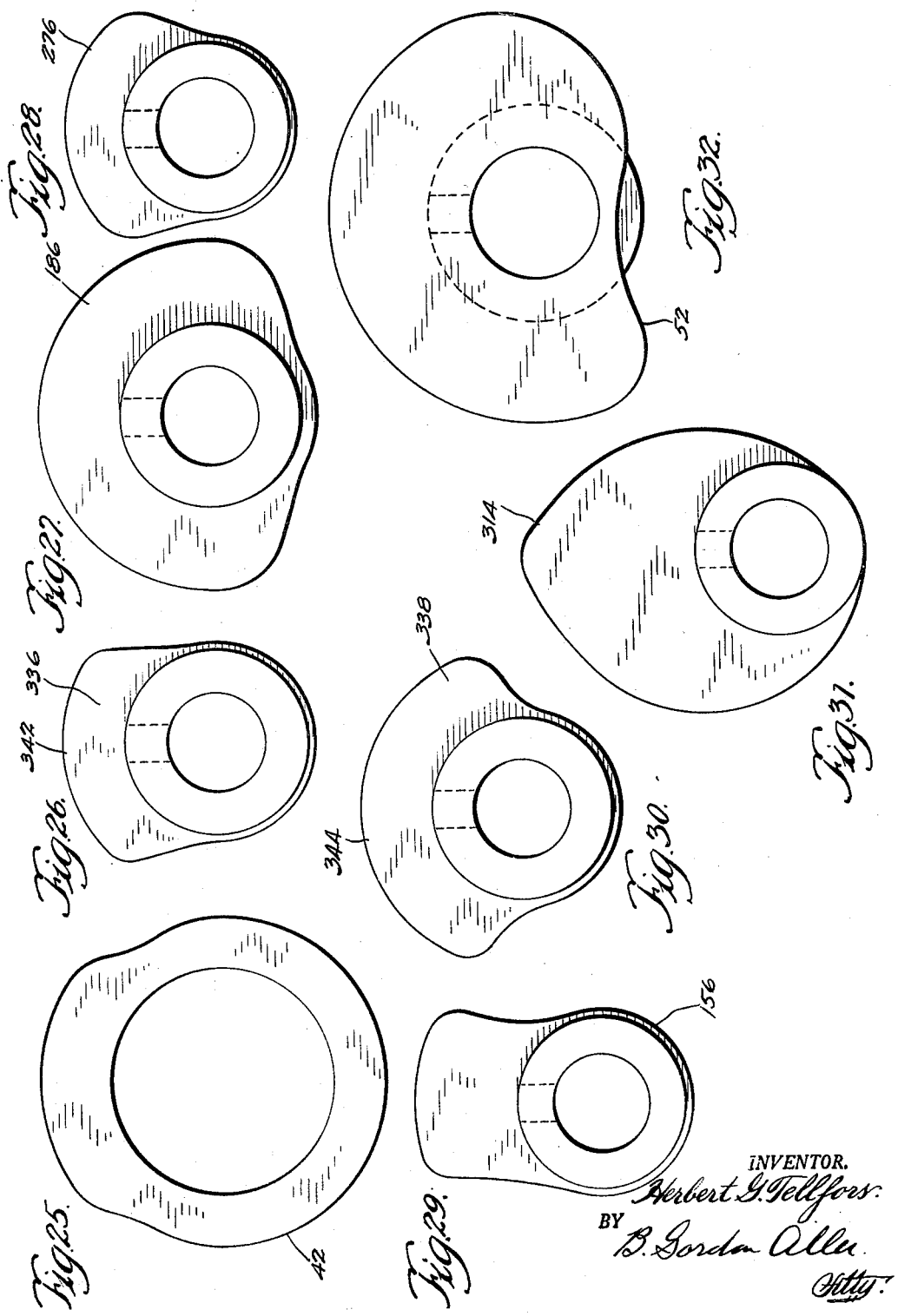

Patented Apr. 3, 1951

2,547,508

UNITED STATES PATENT OFFICE 2,547,508

TICKET PASTING MACHINE

Herbert G. Tellfors, Chicago, Ill., assignor to Clybourne Machine Corporation, Cook County, Ill., a corporation of Illinois Application March 8, 1947, Serial No. 733,304

9 Claims. (Cl. 216—9)

This invention relates to a novel device for securing a tab or tabs to an associated backing.

A general object of the invention is to design a novel apparatus for pasting or gluing tabs in a predetermined pattern on a backing.

Another object of the invention is to provide a novel device for applying an adhesive such as glue to each tab as it is carried to the backing.

Still another object is to move the backing according to a predetermined program, thereby affording a predetermined pattern in which the tabs are secured to the backing.

A further object of the invention is to provide a novel device for carrying the tabs to the backing and for pressing the tabs thereagainst.

Another object of the invention is to devise an apparatus such as above described wherein the tabs are automatically collected and assembled for engagement with a carrier device which transfers the tabs to the backing and presses them thereagainst.

Another object of the invention is to provide a novel suction operated conveyor system for tabs in an apparatus of the above type, whereby the tabs are collected on suction carriers and are moved to position for engagement with a suction carrier head which transfers the tabs from the carriers to the backing and presses the tabs thereagainst.

Still another object of the invention is to automatically control the suction or vacuum in the carriers and carrier head so that the carriers are opened to atmospheric pressure when aligned with the head and are connected to a source of vacuum when conveying the tabs to their head-engaging position, the head being opened to atmospheric pressure except during the advance phase of its cycle when it transfers the tabs to the backing.

Still another object of the invention is to provide an automatic clamp which clamps the tabs against the backing as the carrier head is withdrawn therefrom on the return phase or stroke of its cycle, said clamp automatically releasing the tabs as the backing support moves to a new position to receive a new set of tabs.

Another object of the invention is to design a machine such as above described wherein all of the parts are automatically operable without the necessity of attendance by the operator, except to supply the tabs and backings to the associated portions of the device.

The invention comprehends a novel backing support mechanism which is capable of adjustment to move the backing according to a predetermined program.

The invention also comprehends a novel carrier assembly which is expansible and contractable to transfer the tabs from one position to another in operation of the machine.

The foregoing and other objects and advantages of the invention will become apparent from a consideration of the following specification and the accompanying drawings wherein:

Figure 2 is a side elevation thereof;

Figure 3 is a top plan view of the machine which is partly shown in horizontal section;

Figure 4 is a sectional view of the backing support wheel, taken on the line 4—4 of Figure 3 with the associated actuating mechanism shown in elevation;

Figure 5 is a rear elevation of the backing support wheel and associated gears, taken from the left as seen in Figures 1-3;

Figure 6 is a rear elevation of the tab carrier assembly, the left half of this view showing the assembly in the closed or contracted position thereof, and the right half showing the assembly in the open or expanded position thereof;

Figure 7 is a sectional view on the line 7—7 of Figure 6 showing the tab carrier assembly and associated actuating mechanism;

Figure 8 is a perspective view of one of the inner tab carriers;

Figure 9 is a perspective view of one of the outer tab carriers;

Figure 10 is a front elevation of the raker assembly;

Figure 13 is a fragmentary side elevation of the machine showing the raker assembly in retracted tab-engaging position;

Figure 14 is a side view, partly in vertical section and partly in elevation, taken from the left as seen in Figure 10, showing the raker assembly in advance position, the assembly being shown in solid lines in its tab-engaging position and in dot and dash lines in its release position;

Figure 15 is a perspective view of one of the tab rakers;

Figure 16 is a front view of the sucker or carrier head and associated actuating mechanism, the head being shown in its return or retracted position in engagement with the tab carriers which are illustrated in their closed position;

Figure 17 is a sectional view on the line 17—17 of Figure 16 showing the sucker head in solid lines at its return or retracted position and in dot and dash lines at its advance position applying a set of tabs to the backing support wheel;

Figure 33:
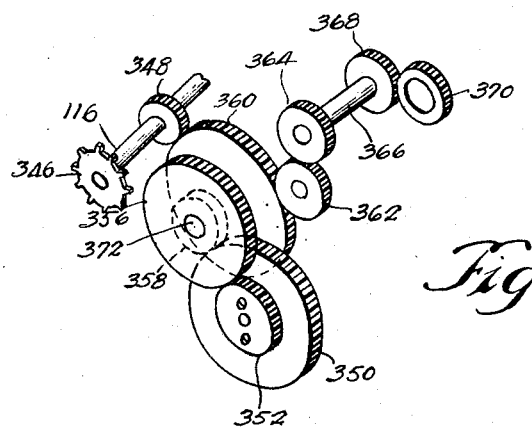
Figure 20:
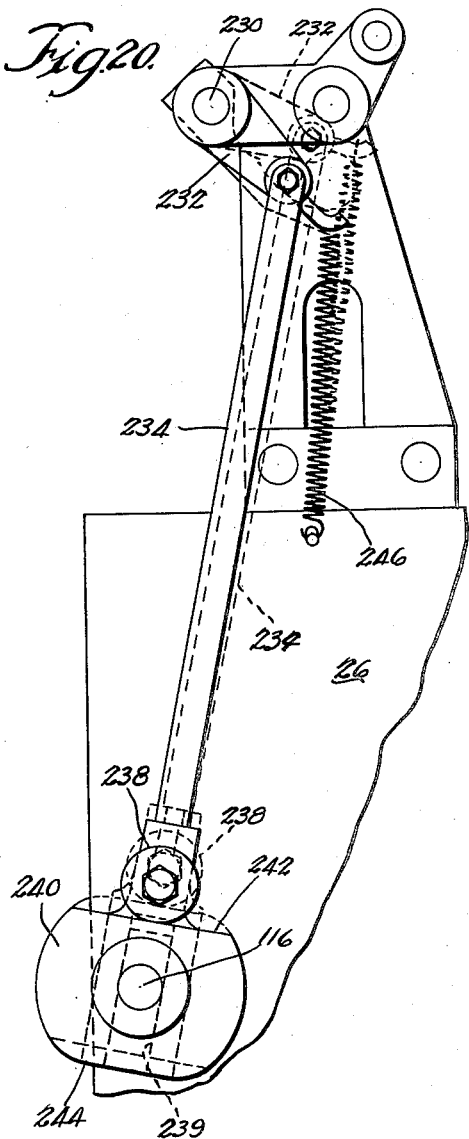
Figure 21:
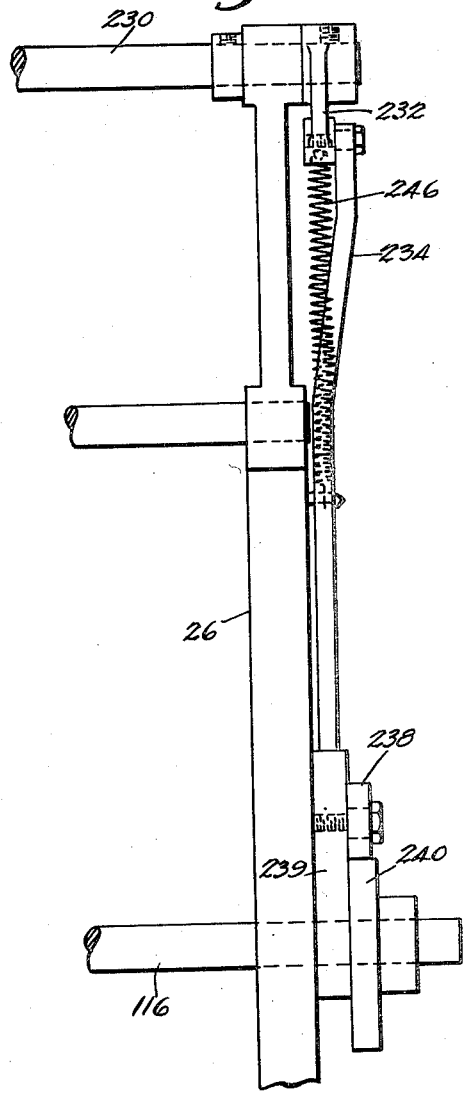

Figure 18 is a perspective view of the sucker head bracket;

Figure 19 is a perspective view of the sucker head;

Figure 20 is a view in side elevation, taken from the right as seen in Figure 16 and illustrating the actuating mechanism for the sucker head lifting finger;

Figure 21 is a front elevational view of the structure shown in Figure 20;

Figure 22 is a front view of the glue finger assembly and the main cam shaft of the machine;

Figure 23 is a side elevational view of the vacuum valve assembly;

Figure 24 is a rear elevational view, partly in section, of the valve assembly, taken from the left as shown in Figure 23;

Figures 25-32 are side elevational views of various cams utilized in the machine, Figure 25 showing the lifter cam for the wheel-actuating pawl, Figure 26 showing the tab carrier valve cam, Figure 27 showing the retractor cam for the raker assembly, Figure 28 showing the clamp plate actuating cam, Figure 29 showing the lifter cam for the raker assembly, Figure 30 showing the sucker head valve cam, Figure 31 showing the glue finger lifter cam, and Figure 32 showing the backing support wheel-actuating cam;

Figure 33 is a perspective view of the gear system which actuates the various parts of the machine.

Figure 1:
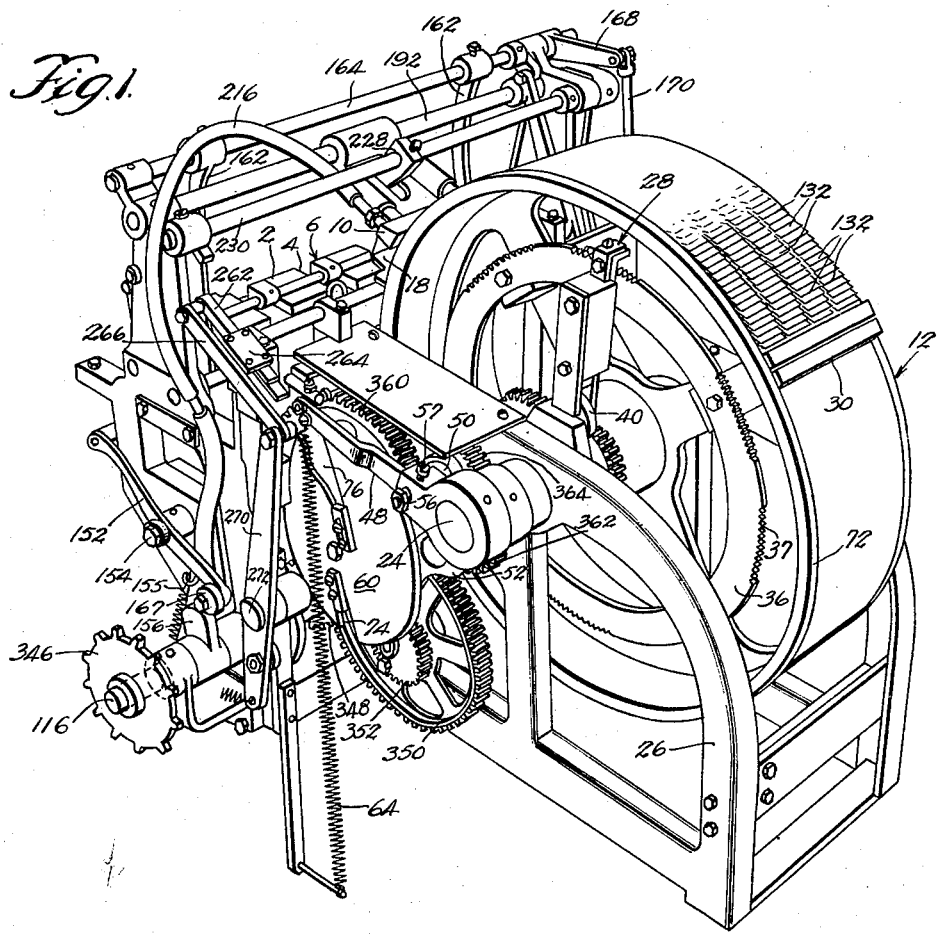
Figure 1 is a perspective view of the machine.

Describing the machine generally and referring first to Figures 1-3, the device comprises a gate member 2 having a plurality of horizontal gates 4, as best seen in Figure 3. The gates are aligned with a plurality of belt conveyors 5 forming part of a mechanism (not shown) for performing an operation such as printing on tabs or tickets which are conveyed by the conveyors 5 to the respective gates 4.

The tabs are raked from the gates 4 by a raker assembly, generally designated 6 (Figures 1 and 2) which moves the tabs onto sliding tab carriers 8 forming part of a carrier assembly hereinafter described in detail. The tabs are conveyed by the carriers 8 as the latter are moved to their closed or contracted position at the longitudinal center line of the machine, as best seen in Figure 3.

The tabs are then picked up from the carriers by a head 10 (Figure 2) which carries the tabs to a backing support wheel 12 wiping the tabs across glue fingers 14 which are actuated, as hereinafter described, to intercept the path of the tabs as they are carried toward the wheel 12.

The carrier head 10 then presses the tabs against the wheel which, in the illustrated embodiment of the invention, carries a flexible backing element such as a piece of cardboard, to which the tabs are glued or pasted.

The tabs are then held against the backing element by a clamp or retainer plate 18 until the carrier head moves on the return phase or stroke of its cycle to the carriers 8 which have received a new set of tabs, as heretofore described.

The wheel 12 is rotated, as hereinafter described in detail, to a new position for each advance stroke of the carrier head 10 so that the tabs overlap each other in the illustrated embodiment of the invention, as best seen in Figure 1. As will be understood from the detailed discussion of the wheel-actuating mechanism, the movement of the wheel may be adjusted to produce any desired arrangement or pattern of the tabs on the backing element carried by the wheel.

Describing the machine in detail and referring first to the backing support wheel and associated actuating mechanism, the wheel comprises a hub 22 (Figures 3 and 4) rotatably mounted on a shaft or axle 24 carried by the frame 26 of the machine. The wheel is rotated on the shaft 24 in a clockwise direction, as seen in Figures 1 and 2, by a ratchet mechanism 28, hereinafter described in detail. The wheel is provided with pairs of clamp bars 30 resiliently urged against the outer perimeter of the wheel by spring and bolt assemblies 31, as best seen in Figures 2 and 4, each bar having an arm 32 with which to rock the bar against the resistance of the associated springs for lifting an edge of the bar to receive a backing element to which the tabs or tickets are to be affixed, as hereinafter described.

The wheel-actuating ratchet mechanism 28 comprises an annular ratchet plate 36 fixed to the wheel 12 and having teeth 37 (Figures 1 and 2) for engagement by a pawl 38, as best seen in Figure 4. The pawl is mounted in a bracket 35 keyed to the shaft 24 and containing an adjustable spring 39 (Figures 2 and 4) bearing against a spring seat 41 on the pawl 38 to urge the latter into engagement with the teeth 37 of the plate 36. The pawl 38 carries at its lower extremity a roller 40 engageable with a cam 42 keyed to a collar 44 which is rotatably mounted on the shaft 24. The cam is actuated, as hereinafter described, to intermittently disengage the pawl 38 with respect to the ratchet plate 36.

The shaft 24 is also keyed to a lever 48 carrying a roller 50 engageable with a cam 52 operated by a gear system hereinafter described. As best seen in Figure 1, the roller 50 is adjustably mounted by a bolt 56 and set screws 57 within a slot in the lever to raise and lower the roller 50, thereby accommodating adjustment of the extent to which the lever 48 is rotated by the cam 52. In this manner the rotational increment of the wheel 12 at each actuation of the lever 48 may be adjusted.

It may be noted, as hereinafter discussed in connection with the operation of the machine, that the pawl 38 and the lever 48 are actuated so that the pawl 38 is raised by its associated cam 42 as the lever 48 is lowered by its associated cam 52 to the lowest position accommodated by a rotatable stop plate 60 engageable with a stop pin 62 carried by the lever 48 adjacent its free extremity. The lever is connected to a tension spring 64, the lower extremity of which is secured to the frame 26, said spring being operable to rotate the lever 48 counterclockwise or downwardly, as seen in Figures 1 and 2, into engagement with the plate 60 when the lever is released from its raised position by the cam 52. Thus as the pawl 38 is raised, the lever 48 is urged downwardly or counterclockwise by the spring 64 to move the pawl counterclockwise to a position whereat a new tooth on the ratchet plate 36 is engaged by the pawl as the latter is dropped or released by its associated cam 42, whereupon the lever 48 is raised or moved clockwise by the cam 52, and the wheel 12 is rotated clockwise to a new position dependent upon the adjustment of the roller 50. Counterclockwise movement of the wheel is prevented by a brake shoe 66 (Figure 2) pivoted at 68 to the frame 26 and urged by a spring 70 against the outer perimeter of the wheel 12 at the flanged edge 72 thereof.

It may be noted that the stop plate 60 predetermines the extent of the counterclockwise movement or drop of the lever 48. In the arrangement shown, the plate 60 is formed with two radial slots 74 and 76, the slot 74 being relatively shallow and being arranged to register with the pin 62, as each relatively small untoothed segment 78 (Figure 2) of the ratchet plate 36 is in position to be engaged by the pawl 38. Thus the lever 48 is rotated counterclockwise by the spring 64 to the extent accommodated by the slot 74, thereby moving the pawl across the space 78 into position to engage the next tooth on the plate 36. This provides a small space between the rows of tabs which are fixed to the backing, as hereinafter described. The relatively deep slot 76 of the stop plate 60 is adapted to register with the pin 62 as the pawl reaches each relatively large untoothed segment 79 of the ratchet plate 36. Thus, as the lever 48 is rotated clockwise from the slot 76, the wheel 12 is rotated clockwise in a relatively great increment, thereby moving a new backing element on the wheel into position for the securement of tabs thereto.

Thus it will be understood that by substituting stop plates 60 with radial slots of various depths and ratchet plate 79 suitably toothed, and by adjusting the roller 50, various desired increments of rotation of the wheel 12 may be effected. If desired, a continuously toothed ratchet plate 79 may be utilized so that only the stop plate 60 need be changed to adjust actuation of the wheel. In the illustrated embodiment, the diameter of the plate 60 is such that the pawl 38 is moved upon lowering of the lever 48 to a position one tooth counterclockwise from the vertical position of the pawl 38, as shown in Figure 2, except when one of the slots 74 or 76 is registered with the pin 62. This produces a close spacing of the tabs which are thus arranged in overlapping rows on the backing, as seen in Figure 1, a slight spacing of the tabs at a point approximately centrally of the backing being produced, as above described, when the pin 62 is registered with the slot 74 of the stop plate 60.

Figure 11:
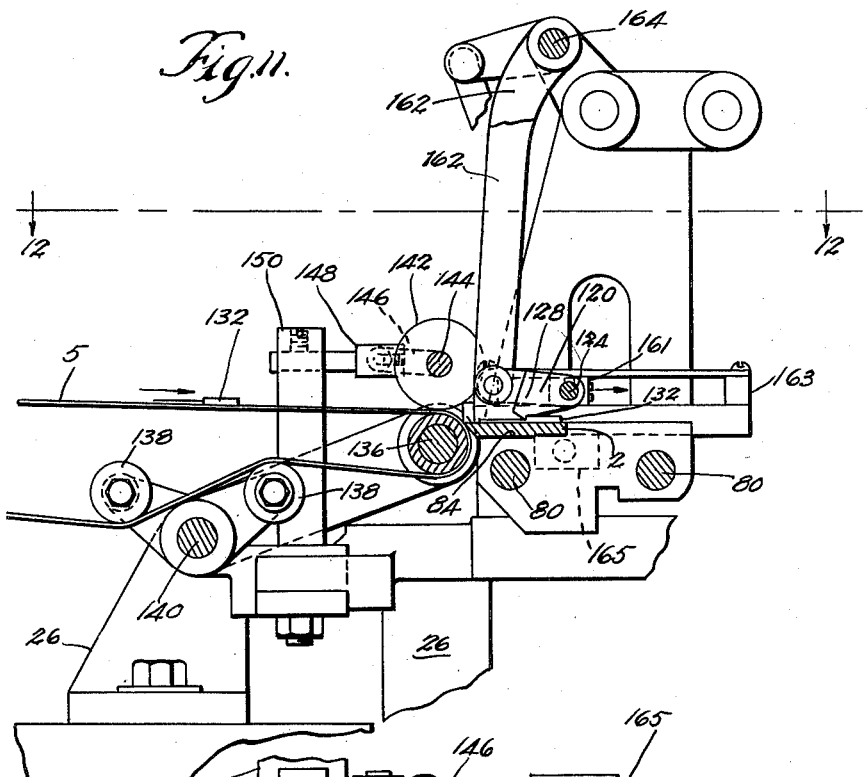
Figure 11 is a side elevation of the raker assembly, partly in section, on the line 11—11 of Figure 10.
Figure 12:
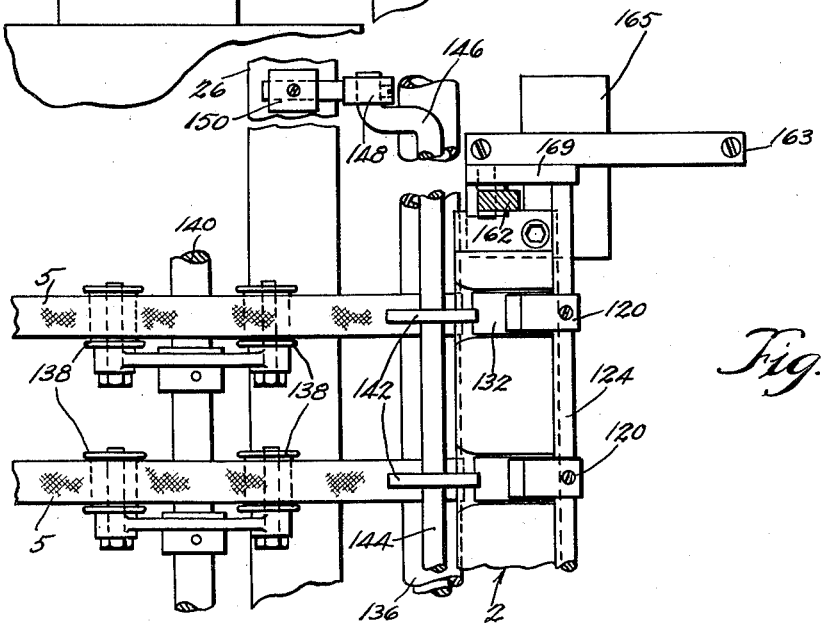
Figure 12 is a sectional view of the structure shown in Figure 11 taken on the line 12—12 thereof.

Referring now to Figures 6–9 inclusive, the carrier assembly is shown in detail, said assembly comprising the before-mentioned carriers 8 which are slidably supported on a pair of frame-mounted rods 80. Each carrier comprises a top suction surface 82 adapted to receive and retain a tab, as hereinafter described, said surface being offset as at 84 to fit beneath the gate member 2, as best seen in Figures 3 and 11, so that the tabs may be raked from the gates 4 onto the surfaces 82, as hereinafter described. One of the inner carriers 8 is shown in detail in Figure 8 and comprises a suction port 86 connected to a pair of suction ports 90 at the surface 82 of the carrier. The carrier 8 also comprises a pair of transverse openings 92 to accommodate the before-mentioned rods 80 and is provided with a depending perforated lug 94 for connection to a link 96, as best seen in Figure 7. One of the outer carriers 8 is shown in Figure 9, the parts thereof being substantially the same as those of the inner carrier shown in Figure 8 and being identified by corresponding numerals except for the provision of a relatively wide shoulder or ledge 95 at the outer side thereof, as may also be noted in the rear view of Figure 6.

The lug 94 of each inner carrier is connected by a link 96 to a lever 98, and the lug 94 of each outer carrier is connected by a link 100 to a lever 102. It may be noted that each link 96 extends past the adjacent outer carrier 8 for connection to an inner carrier. Each pair of levers 98 and 102 are pivotally interconnected by a bolt 103 connected to the lever 98 adjacent its lower extremity and having a square head 104 (Figure 6) received within a complementary slot or opening in the bottom of the lever 102, and the levers 98 and 102 of each pair are fulcrumed as at 106 and 108 respectively to a frame-mounted bracket 110. The lever 98 carries a roller 112 at its lower extremity for engagement with a cam 114 mounted on a shaft 116 (Figure 6) which is the main cam shaft of the machine. As shown in Figure 6, the corresponding levers 102 are connected by a tension spring 115 to urge the levers and the carriers 8 to the closed position shown in the left half of Figure 6 after the rollers 112 have been released by the cams 114. The right half of Figure 6 shows the levers and the associated carriers 8 in their open position to which they are moved by the associated cams 114 against the resistance of the spring 115.

It may be noted that the levers 98 and 102 of each pair are fulcrumed at different points on the bracket 110 so that the levers 102 which actuate the outer carriers 8 move through greater arcs than the levers 98 which actuate the inner carriers 8 inasmuch as the outer carriers move through a distance approximately twice as great as that through which the inner carriers move during the expansion and contraction phases of the carrier assembly cycle. If desired, another spring 115 may be connected between the corresponding levers 98 to increase the resilient force urging the carriers 8 to their closed position after the rollers 112 have moved to their released position, as shown at the left of Figure 6.

It may be noted, as best seen in Figures 6 and 7, that the port 86 of each carrier 8 is connected to a flexible vacuum tube 117, the tubes 117 being connected to a vacuum pipe or line 119 which is connected to associated valve means serving a purpose hereinafter described.

Referring now to Figures 10–15 and 22 which show the raker assembly 6 in detail, it will be seen that each raker, one of which is illustrated in detail in Figure 15, has an opening 122 extending transversely therethrough for the reception of a rotor rod 124, as best seen in Figure 10. The raker is fixed to the rod 124 as by a set screw (not shown) threaded into an opening 126 in the top of the raker 120. The raker is provided on its lower rear surface with a flange or ledge 128 (Figure 15 adapted to engage a complementary shoulder of a tab 132 (Figure 11). The tab is conveyed to the gate member 2, as above noted, by a conveyor belt 5 passing around a roller 136 and between a pair of tightener rollers 138 supported by a frame-mounted shaft 140 for clockwise rotation thereon as seen in Figure 11 to tighten the belt 5. A knurled idler wheel 142 is provided to ride on each belt 5 to guide the tabs carried thereby into the associated gate 4, said wheels 142 being rotatably mounted on a shaft 144, the ends of which are bent or flanged rearwardly as at 146, each end being journaled in a bearing block 148 mounted on a bracket 150 forming a part of the frame 26.

As each tab is deposited within the associated gate 4, it is removed therefrom by one of the rakers 120 which is actuated into engagement with the tab, as shown in Figure 11 by a lever 152 (Figures 10, 13 and 14) fulcrumed at 154 to the frame 26 and urged by a tension spring 155 into engagement with an actuating cam 156 mounted on the main cam shaft 116. The lever 152 is pivoted to a link 158 which is in turn pivoted to a lever 160 keyed to the rotor rod 124 for rotation thereof. It may be noted that each end of the rod 124 is journaled in a bearing 161 (Figure 11) which is slidably mounted in a slide bracket 163 supported by a frame-mounted block 165 which also supports one end of the gate member 2.

Thus as the lever 152 is rotated in a counterclockwise direction by the cam 156 which engages a roller 167 mounted on the lower end of the lever 152, the rod 124 and the associated rakers 120 are rotated from the release or raised position thereof to the lowered or tab-engaging position shown in Figures 11 and 13. While the rakers are lowered the rotor rod 124 is urged forwardly on its advance stroke by a pair of arms 162 connected thereto by links 169 and keyed to a rotatable shaft 164 which is supported by the frame, said shaft being connected to an actuating spring 166 (Figures 10 and 13) by a lever 168 keyed to the shaft 164 and connected to a rod 170 sleeved within the spring 166 and carrying a seat 172 engaging the upper end thereof. The lower end of the spring 166 is supported by a frame-mounted spring seat 174 (Figures 10 and 22). The spring 166 is operable to actuate the arms 162 and the shaft 164 by rotating the lever 168 and the shaft 164 in a counterclockwise direction, as seen in Figures 11, 13 and 14, whereupon the tabs 130 are urged by the rakers 120 on their advance stroke, shown in solid lines in Figure 14, thereby moving the tabs onto the carriers 8 which are at this time registered with the gates 4. The rakers 120 are then raised to their release position shown in dotted lines in Figure 14, as the roller 167 on the lever 152 rides downwardly to the smallest radius of the cam 156, as shown in dotted lines in Figure 14. The rakers 120 are then moved on the return stroke or phase of their cycle to the position shown in Figure 13 by a rod 176 (Figures 13 and 14) pivoted at 178 to a lever 180 keyed to the shaft 164, said rod 176 having a fork 182 (Figures 13 and 22) engaging the cam shaft 116 and carrying a roller 184 engaged with a cam 186 mounted on said shaft for actuation of the rod 176 to move the rakers on their return stroke.

Referring now to Figures 16–21 which show in detail the carrier or sucker head 10 and its associated actuating mechanism, the assembly comprises a bracket 188, shown in detail in Figures 16 and 18, and having a transverse opening 190 for the reception of an associated shaft 192 fixed thereto. The bracket also comprises a pair of cylindrical lugs 193 at opposite sides thereof with longitudinal pin openings 194 for a purpose hereinafter described. The bracket is slotted at 195 for the reception of a roller 196 which is mounted between a pair of blocks 198 and 200 having a pin and socket connection at 202 (Figure 16) and fixedly connected to a pair of rods 204 extending through the openings 194 in the bracket 188. Each pin is fixed to the sucker head 10 which is shown in detail in Figures 16 and 19, and a spring 208 is sleeved over each pin under compression between the sucker head and the associated bracket lug 193 to urge the head to its extended position, as shown in Figure 16, wherein the head is engaged with the carriers 8 to lift the associated tabs therefrom.

The sucker head has four suction faces 210 (Figure 19) with suction ports 212 therein communicating with a passage 214 connected to a flexible vacuum line 216.

In operation of the sucker head, it is actuated on its advance stroke to the wheel 12 by a lever 218 keyed to the shaft 192 and pivotally connected to an actuator rod 220, the lower end of which is provided with a fork 222 embracing the cam shaft 116 and carrying a roller 224 engaged with a cam 226 on the cam shaft. The rod 220 is connected to a spring 227, the lower end of which is mounted on the frame 26 for urging the sucker head to its return position when the roller 224 engages the smallest radius of the cam 226. In Figure 17, the cam 226 and the roller 224 are illustrated in solid lines in the lowest position of the roller at which the sucker head 10, as shown in solid lines, is at the end of its return stroke in engagement with the carriers 8 which are at this time in their closed position, as shown in Figure 16. The cam 226, roller 224 and sucker head 10 are shown in dotted lines in Figure 17 in the position at which the sucker head 10 at the end of its advance stroke engages the wheel 12 to press the tab 132 thereagainst.

Figures 17, 20 and 21 show the actuating mechanism for extending and retracting the sucker head with respect to the bracket 193, said mechanism comprising a finger 228 (Figure 17) engaging the roller 196 and fixed to a rotatable frame-mounted shaft 230 which is fixedly connected to a lever 232 (Figures 20 and 21). The lever 232 is pivoted to an actuator rod 234 carrying a roller 238 adjacent its lower extremity which is provided with a fork 239 embracing the cam shaft 116. The roller 238 is engaged with a cam 240 mounted on the shaft 116. This cam has two flat faces 242 and 244, the face 242 being closest to the axis of the cam shaft 116. Thus as the sucker head 10 reaches its return position shown in solid lines in Figure 17, the face 244 engages the roller 238 to accommodate counterclockwise rotation of the lever 232 by a spring 246 connected thereto and to the frame 26. This action lowers the finger 228 to extend the sucker head to a point slightly above the carriers thereby lifting the associated tickets therefrom, as hereinafter more fully described in connection with the vacuum valves connecting the sucker head and carriers to associated vacuum lines. When the sucker head 10 reaches its advance position adjacent the wheel 12, the face 242 of the cam 240 engages the roller 238, thereby accommodating lowering of the finger 228 to afford full extension of the sucker head by the springs 208 which press the head and the associated tabs firmly against the wheel 12, as shown in dotted lines in Figure 17. It may be noted as shown in dotted lines in Figure 20 that as the sucker head moves to and from its advance and return positions the roller 238 rides on the arcuate portions of the cam 240 intermediate the faces 242 and 244, whereby the finger 228 is raised to lift the sucker head to its retracted position relative to the bracket against the resistance of the springs 208.

As the sucker head reaches its advance and extended position the tabs carried to the wheel 12 are held thereagainst by the clamp plate 18 which is supported at one end thereof by a pintle 252 (Figure 3) journaled in a bracket 250 mounted on the frame 26. The plate 18 is supported at the opposite end thereof by a pintle 254 (Figure 3) journalled in frame-supported brackets 256 and 258. The pin 254 is connected at a point outboard the bracket 258 to a pinion 260 (Figure 2) operatively engaged with a rack 262 slidable in a guide bracket 264 mounted on the frame 26. The rack 262 is pivotally connected at its upper end to a link 266, the lower end of which is pivoted to a lever 270 fulcrumed at 272 (Figure 2) to the frame 26 and actuated by a spring 274 connected to the lower end thereof. The lever 270 is operated by a cam 276 mounted on the cam shaft 116 and engageable with a roller 278 carried by the lever to urge the clamp plate 18 to its release position after the sucker head 10 has been retracted from the wheel 12. Thus when the sucker head is extended to clamp the tabs 132 against the wheel 12, the roller 278 rides to the smallest radius of the cam 276, thereby accommodating actuation of the lever 270 by the spring 274 to urge the clamp plate 18 to its clamping position, as shown in Figure 2, against the associated tabs. After the sucker head 206 has been retracted from the wheel 12 and has passed over the plate 18 on the return stroke of the sucker head to the carriers 8, the plate 18 is returned to its open or release position as the roller 278 rides on the largest radius of the cam 276.

Referring now to Figures 3, 13, and 22 which illustrate in detail the glue finger assembly generally designated 286, it will be seen that this assembly comprises a glue pot 288 supported at its ends by frame-mounted brackets 290 in tongue and groove engagement therewith, as best seen in Figure 3, said pot containing a supply of liquid adhesive such as mucilage. The before-mentioned glue fingers 14 are mounted on a support bar 294 and are actuated by a pair of rods 296 having their ends bent downwardly as at 298 to afford convenient connection to the bar 294 adjacent its ends. One side wall of the pot 288, as best seen in Fig. 3, is offset to form bosses 300 equally spaced from each end and bored to receive rods 296, which are thus spaced from the adhesive in the pot. The rods 296 are connected at their lower extremities to a bar 302 affording seats for springs 303 sleeved over the rods 296 and seated against the lower surface of the glue pot. The bar 302 is supported by a cam roller support bar 304 to which is connected a bracket 306 carrying a cam roller 308. Each end of the bar 304 is provided with a guide pin 310 slidably fitted within a frame-mounted guide or support bracket 312.

The roller 308 rides upon a cam 314 mounted on the shaft 116 and adapted to raise or advance the glue fingers to intercept the path of the tabs carried by the sucker head 10 as it moves on its advance stroke toward the wheel 12. After the glue has been applied to the tabs by the fingers 14, they are retracted into the pot by the springs 303 as the roller 308 rides to the smallest radius of the cam 314. This cycle is more fully described in connection with the detailed description of the operation of the machine.

Referring now to Figures 23 and 24, the vacuum control valves for the machine and the actuating mechanism associated with said valves are shown in detail. The carrier vacuum valve 316 is shown at the left of Figure 24, which is a view taken from the rear of the machine, and the sucker head vacuum valve 318 is shown at the right of Figure 4 and is substantially identical with the valve 316, portions of the valve 318 being broken away to illustrate the internal construction thereof. Each of these valves comprises a body or casing 320 with a cylindrical stem 322 slidably fitted within a complementary bore 323 in the body, said bore being connected to a vacuum line 324. The stem 322 is provided with a bleeder notch or groove 326, as shown in the right of Figure 24.

The bore of the valve 316 is connected to a line 330 which is connected to the before-mentioned vacuum line 119 associated with the carriers 8, as shown in Figure 6, and the bore of the valve 318 is similarly connected to a line 331 which is connected to the before-mentioned sucker head vacuum line 216 (Figure 16).

Each valve stem 322 is operated by a lever 332 (Figure 23) pivoted to the stem and fulcrumed to a frame-mounted rod 335. The lever carries a roller 334 engageable with an associated cam. In this connection, the carrier valve lever at the left of Figure 24 is actuated by a cam 336 engageable with the associated roller 334, and the sucker head valve lever at the right of Figure 24 is actuated by a cam 338, both cams being mounted on the shaft 116. Each stem 322 is urged to its closed position by a tension spring 340 connected between the frame 26 and the lever 332, said spring being tensioned by the lever as it urges the stem upwardly to its open position under the action of the associated cam. In the closed position of the valve 318 the line 331 is opened to atmospheric pressure through the bleeder notch 326 as shown in Figure 24 and in the closed position of the valve 316 the line 330 is similarly opened to atmospheric pressure through the associated bleeder notch (not shown).

In Figures 23 and 24 the carrier valve 316 is in its lower or closed position with the line 330 open to atmospheric pressure, and the valve 318 is moving to its open position to connect the line 331 with the associated vacuum line 324, thereby creating a vacuum or suction in the sucker head ports 212 as the sucker head engages the tabs on the carriers.

It may be noted with reference to Figure 26 that the carrier valve cam 336 shown therein opens the carrier valve 316 when the largest radius of the cam, indicated at 342, engages the associated roller 334. Under these conditions, the line 324 is connected through the line 330, the line 119 and the lines 117 to the carrier ports 90 as the carriers 8 receive the tabs from the rakers 120. The valve 316 remains in its open position as the radius 342 of the cam 336 rides on the roller 334 during movement of the carriers from their open or expanded position to their closed position carrying the tabs into alignment with the path of the sucker head 10 as the latter moves to its return position to lift the tabs from the carriers 8. At this point the valve 316 is closed admitting the line 330 to atmospheric pressure as the associated roller 334 moves to the smallest radius of the cam 336.

As will be understood from a consideration of Figure 30, the sucker head valve cam 338 illustrated therein opens the valve 318 when the largest radius of this cam, indicated at 344, engages the roller 334. The radius 344 of the cam 338 extends through a relatively great arc to maintain the valve 318 in open position as the sucker head lifts the tabs from the carriers 8 and moves on its advance stroke to the wheel 12 to press the tabs thereagainst. Before the sucker head is retracted from the wheel 12 prior to its return stroke, the valve 318 is closed as the roller 334 rides to the smallest radius of the cam 338, whereupon the valve 318 is closed admitting atmospheric pressure to the line 331 and releasing the suction within the sucker head ports 212. It will be understood that the valve 318 remains closed as the sucker head moves on its return stroke until the sucker head is extended in its return position to lift the tabs from the carrier 8 at which time the roller 334, associated with the valve 318, rides to the largest radius 344 of the cam 338, thus opening the valve 318 at the same time that the roller 334, associated with the valve 316, rides to the lowest radius of the cam 336 closing the valve 316 and admitting atmospheric pressure to the line 330 and the carrier ports 90.

Referring now to Figure 33 which shows the gear system of the machine in perspective, the main cam shaft 116 is fragmentarily illustrated with a sprocket 346 on the outboard end thereof adapted for connection to an associated chain (not shown) affording a convenient connection to an associated power device (not shown) such as for example, an electric motor. The shaft 116 carries a main drive gear 348 which is meshed with a relatively large-diameter gear 360 compounded to a relatively small-diameter gear 358. The gear 358 is meshed with a large diameter gear 350 which is compounded to a smaller gear 352. The gears 350 and 352 are rotatable on a spindle 328 as shown in Figure 5. The gear 352 is meshed with a gear 356 connected, as shown in Figure 5, to the stop or index plate 60 for rotation thereof. The gear 360 is meshed with a gear 362 fixed to the wheel-actuating cam 52, as shown in Figure 4. The gear 362 is meshed with a gear 364 keyed to a shaft 366 which is keyed to an inboard gear 368 meshed with a gear 370 fixed to the pawl cam 42 by means of the before-mentioned collar 44, as shown in Figures 3 and 4. It may be noted that the gear 356 and the compound gear 358, 360 are independently rotatable on a spindle or shaft 372, as best seen in Figure 5.

Having thus described the novel machine, the detailed operation thereof is hereinafter discussed. With the sucker head 10 in its return position and extended to its lowest position toward the carriers 8 which are in their closed position, the sucker head lifts the tabs from the carriers and is retracted upwardly by the finger 228 whereupon the carriers move toward their open position to receive a new set of tabs. The glue fingers 14 are at this time extended upwardly to intercept the path of the tabs as they are carried toward the wheel 12 by the sucker head 10. After the glue fingers 14 have engaged the tabs they are retracted into the glue pot 288 to receive another coating of glue. The sucker head 206 meanwhile moves to the wheel 12 and is extended by release of the finger 228 to press the tabs against the backing carried by the wheel. At this point the clamp plate 18 clamps the rear ends of the tabs against the backing. The sucker head is then exhausted by closing of its associated valve 318, as above described, and is retracted by the finger 228 whereupon the sucker head is moved on its return stroke to the carriers 8. The clamp plate is then released.

Meanwhile, as above noted, after the sucker head has been retracted from the carriers preparatory to its advance stroke, the carriers are moved to their open position until they are registered with the gates 4, whereupon the rakers 120 are rotated to their applied position in engagement with the set of tabs which have been conveyed to the gates by the belts 5. The rakers are then advanced to rake the tabs onto the carriers 8, the suction ports of which are at this time connected to the associated vacuum line 324 by the valve 316. The rakers are then rotated to their release position and are returned to engage a new set of tabs. After the rakers have been released from the tabs on the carriers 8, the latter are moved to their closed position whereupon the valve 316 is closed to admit atmospheric pressure to the carrier ports 90 as the sucker head is advanced by release of the finger 228 toward the carriers 8 and is connected to the associated vacuum line 324 by opening of the valve 318.

On each return stroke of the sucker head the wheel 12 is rotated to a new position, as above described, so that the tabs are glued to the wheel-supported backing in a predetermined pattern.

It will be understood that if desired suitable changes in the gearing may be made so that the wheel is rotated to a new position after any predetermined number of tabs have been glued one on top of the other to the backing, and also if desired, the wheel may have clamp means instead of a backing to engage the first tabs applied in each new position of the wheel, the glue fingers being preferably retained in their retracted position as these first tabs are applied. Other similar modifications will be readily apparent to those skilled in the art.

Furthermore, it will be understood that if desired one or more of the various features of the novel machine may be eliminated to adapt the machine for use in the fabrication of simpler units which do not require the eliminated features. Also, in certain applications where an economical machine is desired, certain of the subassemblies may be eliminated or may be replaced with equivalents which are well known to those skilled in the art.

It is to be understood that I do not wish to be limited by the exact embodiment of the device shown which is merely by way of illustration and not limitation as various and other forms of the device will be apparent to those skilled in the art without departing from the spirit of the invention and may be adapted if within the scope of the appended claims.

I claim:

1. In a pasting machine a frame, a sucker head movably supported thereby, a ticket support mounted on said frame, a backing element mounted on said frame in spaced relationship to said ticket support, means for moving said head on its advance stroke to said backing element and for moving said head on its return stroke to said ticket support, a vacuum line connected to said head and comprising valve means adapted in open position thereof to open said line to communication with said head, said valve means being adapted in closed position thereof to open said head to atmospheric pressure, operating means for said valve means for opening said valve means as said head reaches its return position and for closing said valve means in advanced position of said head prior to the return stroke thereof, means for applying adhesive to a ticket carried by said head from said ticket support to said backing element, clamp means carried by the frame for clamping the ticket against said backing element, and operating means for said clamp means for actuating said clamp means when said head reaches its advanced position and for releasing said clamp means after said head has moved on its return stroke from said backing element.

2. A machine of the class described comprising a frame, a carrier head bracket movably supported thereby, a carrier head mounted on said bracket and adapted to carry ticket carrying elements, resilient means compressible between said head and a portion of said bracket, a lifter finger movably supported by said frame and engaged with said head to lift the same against the resistance of said resilient means, means connected to said bracket for moving the carrier head on advance and return strokes thereof, operating means for releasing said finger at the end of each stroke of said head and for actuating said finger before the head moves on the next stroke thereof, and means for supplying adhesive to said elements.

3. A pasting machine comprising a movable support, another support for elements to be carried to said movable support, a sucker head movable between said supports for conveying said elements from said other support to said movable support, means for applying liquid adhesive to said elements, said sucker head comprising a surface adapted to engage said elements, and a suction port in said surface, a source of vacuum connected to said port, valve means in said connection, and means for actuating said valve means to admit vacuum to said port as said head moves from the other support to said movable support and for admitting atmospheric pressure to said port as said head moves from said movable support to the other support.

4. In a ticket pasting machine, a frame, an arm pivotally mounted by one end thereon, a carrier head movably supported by said arm, a spring carried by said arm and connected to said head for urging the latter toward the free end of said arm, a support for a backing element, a ticket support, means for pivoting the arm to urge the head on its advance stroke to said backing support and to urge the head on its retraction stroke to said ticket support, a roller carried by said head, a finger pivotally mounted on said frame and engageable with said roller during both strokes of said head to urge the latter against the resistance of said spring toward the pivoted end of said arm, means for pivoting said finger to a release position thereof and then to an applied position thereof to respectively release and stress the spring at the end of each stroke of said arm whereby the head is urged toward the ticket support and is withdrawn therefrom, said head being provided with means for grasping and releasing the ticket, means for actuating the grasping means as said head is urged by said spring toward the ticket support and for actuating the releasing means as said head is urged by said finger from said element.

5. In a ticket pasting machine, a frame, an arm pivotally supported thereby, a carrier head movably mounted on said arm, a spring carried by said arm and connected to said head for urging the latter toward the free end of said arm, a support for a ticket backing element, a ticket support, means for pivoting the arm in one direction to urge said head on its advance stroke toward said backing support and for pivoting said arm in the reverse direction to urge said head on its return stroke to said ticket support, a finger movably supported by said frame and operatively engaged with said head during both strokes thereof to urge said head against the resistance of said spring toward the pivoted end of said arm, means for moving said finger to a release position thereof and then to an applied position thereof whereby said head is urged respectively toward and away from the ticket support at the end of each stroke of the head, said head being provided with means for grasping and releasing a ticket, and means for actuating said grasping and releasing means as said head is urged upon release of said finger toward the ticket support.

6. In a ticket pasting machine, a frame, an arm pivotally mounted by one end thereof, a carrier head movably mounted on said arm, a support for a backing element, a ticket support, means for pivoting the arm in one direction to move said head on its advance stroke to said backing support and for pivoting said arm to move the head on its return stroke to said ticket support, said head being provided with means for grasping and releasing a ticket, means actuating said grasping means at the return position of said head and for actuating said releasing means after said head has reached its advance position, and means for advancing said head toward the free end of said arm and then retracting said head to the pivoted end of said arm after said head has reached the end of each stroke thereof.

7. In a ticket pasting machine, a frame, an arm pivotally mounted thereon, a carrier head movably mounted on said arm, a support for a backing element, a ticket support, means for pivoting the arm in one direction to move said head on its advance stroke to said backing support and for pivoting said arm to move the head on its return stroke to said ticket support, said head being provided with means for grasping and releasing a ticket, and means actuating said releasing means at the return position of the head for releasing said ticket after said head has reached its advance position.

8. In a ticket pasting machine, a support frame, an arm pivotally mounted by one end thereon, a carrier head movably mounted on said arm, a spring carried by said arm and connected to said head and reacting against said head to resiliently urge the same toward the free end of said arm, a support for a ticket backing element, a ticket support, means for swinging said arm in one direction and then in the opposite direction to move said head respectively on an advance stroke toward the first-mentioned support and on a return stroke toward the second-mentioned support, a spring member engaging with said head throughout the advance and return strokes thereof to urge said head against the resistance of said spring member toward the swinging end of said arm, and means for momentarily releasing the pressure of said spring member against said head at the end of each stroke thereof whereby said spring member is operable to momentarily urge said head to the ticket support, a plurality of tickets carried by said head, and means for applying adhesive to the tickets carried by said head from said ticket support to said element.

9. In a ticket pasting machine, a support frame, an arm pivotally mounted by one end to said frame, a carrier head movably mounted on said arm, a spring carried by said arm and connected to said head reacting against said head to resiliently urge the same toward the free end of said arm, a support for a ticket backing element, a ticket support, means for swinging said arm in one direction and then in the opposite direction to move said head respectively on an advance stroke toward the first-mentioned support and on a return stroke toward the second-mentioned support, a member engageable with said head throughout the advance and return strokes thereof to urge said head against the resistance of said spring toward the swingably mounted end of said arm, means for momentarily releasing the pressure of said member against said head at the end of each stroke thereof whereby said spring is operable to momentarily urge said head to the ticket support, means on said head for grasping a ticket to carry the same from said ticket support after said spring has urged said head thereto, means for intercepting the path of the ticket to apply adhesive thereto as said ticket moves with said head on the advance stroke thereof, and means for releasing said grasping means after said spring has urged said head and the ticket carried thereby against said element.

HERBERT G. TELLFORS.

REFERENCES CITED

The following references are of record in the file of this patent:

UNITED STATES PATENTS

| Number | Name | Date |
|---|---|---|
| 688,656 | Lester | Dec. 10, 1901 |
| 902,578 | Harbeck | Nov. 3, 1908 |
| 997,580 | Peters et al. | July 11, 1911 |
| 1,904,720 | Douglass | Apr. 18, 1933 |
| 1,943,483 | Miller | Jan. 16, 1934 |
| 1,972,952 | Radzinsky | Sept. 11, 1934 |
| 2,121,484 | Massini | June 21, 1938 |
| 2,212,165 | Neate et al. | Aug. 20, 1940 |
| 2,279,844 | Smith et al. | Apr. 14, 1942 |
| 2,325,578 | Booty | July 27, 1943 |